United States Patent Office 3,463,428
Patented Aug. 26, 1969

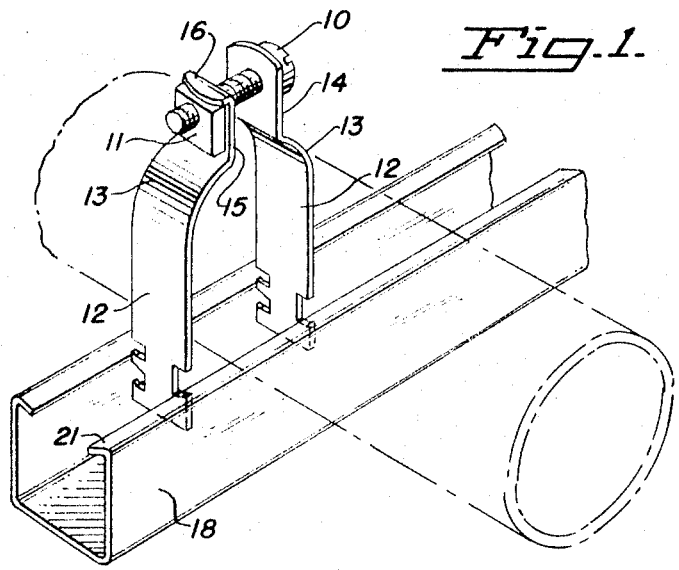
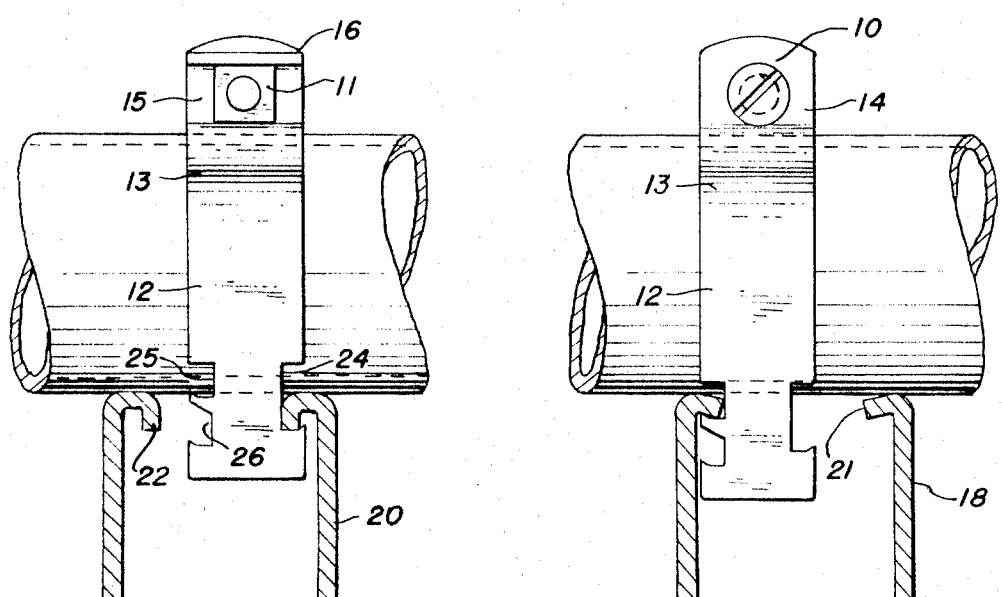

3,463,428
MULTI-PURPOSE PIPE CLAMP
Robert D. Kindorf, 448 Scenic Ave., Piedmont, Calif. 94611, and David O. Kindorf, 6257 Girvin Drive, Oakland, Calif. 94611
Filed June 20, 1967, Ser. No. 647,558
Int. Cl. F16l 3/24, 3/08; E04g 17/18
U.S. Cl. 248—72
2 Claims

ABSTRACT OF THE DISCLOSURE

A clamp for securing pipe to channel-shaped pipe supports of at least two different configurations and capable of being used with more than one pipe or conduit size on each type of channel.

---

Pipes which, as the term is used herein, is intended to include conduit, cable and tubing, is customarily supported on brackets or structures of channel-shaped configuration designed for the ready application and the securement thereto of clamping devices for holding the pipe in place.

There are two types of channels most generally used and each includes a channel section with inwardly turned edges or flanges on the legs of the channel. Manufacturers provide pipe securing clamps of various designs with parts engaging behind these flanges. Since the two leading types of channel have flanges of different configuration, each requires a different type of clamp, and these clamps are not interchangeable.

Clamps are also required in many sizes for each type of channel. There are presently millions of feet of the two types of channel in service where it is anticipated that additional installations of pipe are to be made. For any such installation, a great many different sizes and types of clamps may be required. Not only are clamps required for two different types of channel and many different sizes of pipe and the like but the same nominal size of different products such for example as pipe, thin wall tubing for electrical work and copper tubing varies considerably in actual outside diameter.

It is an object of the present invention to provide improved pipe clamps in which a clamp of one design and one size will serve for more than one type of channel and more than one size and type of pipe or conduit.

Another object is to provide pipe clamps which engage only one rather than two flanges of the channel so that two parts of the clamp may be assembled with threaded adjusting means at the factory and placed in their position of use much more easily than previously used clamps.

A still further object is the provision of adjusting means in the form of a nut and bolt in which the configuration of the clamp holds the nut securely against rotation during adjustment of the bolt.

The foregoing objects and the invention itself will be better understood upon reading of the following specification wherein reference is made to the accompanying drawing which illustrates the invention.

In the drawing:

FIG. 1 is a perspective view illustrating a clamp embodying the present invention shown as securing a pipe, illustrated in broken lines, to a channel support;

FIG. 2 is a view in side elevation of a clamp of the same type as that illustrated in FIG. 1 showing the application thereof to one of the two most commonly used channels; and FIG. 3 is a view like FIG. 2 showing the application of the clamp to the other of the two commonly used channels.

As most clearly shown in FIG. 1 of the drawing, the pipe clamp of the present invention is a generally U-shaped device made of two parts secured together with an adjusting and clamping screw 10 and nut 11. Each of the two parts has a straight leg portion 12, a curve 13 conforming generally to the periphery of the pipe being clamped and tabs 14 and 15 adjacent the curved portions 13 and through which the clamping screw 10 extends. The tab 15 also has a small end portion 16 bent at right angles to the tab to form a flange which lies closely adjacent to the nut 11 as clearly shown in FIG. 2. The size of the tab 15 between the flange and the curved portion 13 is such that the nut fits snugly between them and is positively prevented from rotating. Similar arrangements where the nut is intended to be prevented from rotating by the curved portion 13 have been found unsatisfactory because before tightening of the screw, the nut might occupy a position where it is free to rotate.

The pipe clamp is designed for use with a channel 18 shown in FIGS. 1 and 3 or with a channel 20 shown in FIG. 2. The channel 18 has inwardly inclined flanges 21 at the ends of its legs while the channel 20 has inwardly turned edges 22 at the ends of its legs which are of considerably different configuration than the flanges 21 of channel 18. Previously known clamps designed for use with channels of these types have had the same general configuration as the clamp of the present invention but the straps of which the clamps were made wider than the space between the flanges 21 and 22. These earlier clamps have notches in their lower edges for engagement with both flanges of a channel but since they were wider, they had to be inserted into the channel as two separate parts and the adjusting and clamping means assembled into place while a workman attempted to hold the two parts in their proper position with their ends in the channel and their outer portions embracing the pipe.

This awkwardness of assembly was one of the disadvantages of clamps of this type and another disadvantage resided in the fact that each clamp was made for one pipe size. The clamp of the present invention overcomes the first disadvantage referred to because it is made of strap which is narrower than the space between the flanges of the channel thus enabling assembly of the two clamp parts and the adjusting means at the factory so that a workman can apply the clamp to a pipe and insert its ends in the channel very easily and with one hand while the other hand is free to apply a screwdriver, or wrench as the case may be, to the head of the adjusting screw 10.

The second disadvantage referred to above has been overcome by providing a plurality of notches such as shown in FIGS. 2 at 24, 25 and 26 in the two edges of the legs 12 of the clamp. These notches are spaced to embrace a single flange of either type of channel and by selecting the proper notch for the channel being used, a single size clamp may be used to accommodate pipes or tubing having different outside diameters even though their nominal sizes might be the same. For example the strap shown in FIGS. 2 and 3 is supporting 1¼ inch thin wall tubing on one type of channel in FIG. 2 and the same size on the second type channel in FIG. 3. Standard pipe of nominal size of 1¼ inch is considerably larger and will be accommodated in the channel of FIG. 2 by using notch 26 and in the channel of FIG. 3 by using the notch 24.

We claim:

1. A pipe clamp for use with pipe supporting channels of different configurations and of the type which have inwardly extending flanges defining a longitudinally extending slot between the ends of its legs, the clamp comprising two metal straps each strap having at least one notch on each edge of a part insertable in the slot for engagement selectively with opposite flanges to accommodate pipes of different size and channels of different configuration, each strap having an end projecting away from the flanges to embrace a pipe and adjustable means between said ends to draw them together and embrace the pipe, the notches in the edges of each strap being spaced different distances from the end of the strap, said straps being narrower than the slot throughout the entire part of their length that is insertable into the slot whereby only one notch will engage one of said flanges.

2. The combination of claim 1 in which at least one edge of each strap has more than one notch to engage a flange to adapt the clamp to pipes of various sizes.

References Cited

UNITED STATES PATENTS

| | | | |
|---|---|---|---|
| 1,291,471 | 1/1919 | Funk | 24—279 |
| 2,345,650 | 4/1944 | Attwood | 248—72 X |
| 3,154,276 | 10/1964 | Havener | 248—73 |

FOREIGN PATENTS

| | | |
|---|---|---|
| 1,125,239 | 3/1962 | Germany. |
| 130,962 | 2/1951 | Sweden. |

CHANCELLOR E. HARRIS, Primary Examiner

U.S. Cl. X.R.

248—74, 340